United States Patent
Marchand

(10) Patent No.: US 9,021,490 B2
(45) Date of Patent: Apr. 28, 2015

(54) OPTIMIZING ALLOCATION OF COMPUTER RESOURCES BY TRACKING JOB STATUS AND RESOURCE AVAILABILITY PROFILES

(76) Inventor: Benoît Marchand, St-Lanbert (CA)

( * ) Notice: Subject to any disclaimer, the term of this patent is extended or adjusted under 35 U.S.C. 154(b) by 1179 days.

(21) Appl. No.: 12/543,498

(22) Filed: Aug. 18, 2009

(65) Prior Publication Data

US 2010/0043009 A1    Feb. 18, 2010

Related U.S. Application Data

(60) Provisional application No. 61/189,359, filed on Aug. 18, 2008.

(51) Int. Cl.
*G06F 9/46* (2006.01)
*G06F 9/48* (2006.01)

(52) U.S. Cl.
CPC ........ *G06F 9/4881* (2013.01); *G06F 2209/485* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,325,525 A * | 6/1994 | Shan et al. | | 718/104 |
| 5,408,663 A * | 4/1995 | Miller | | 718/104 |
| 5,717,943 A | 2/1998 | Barker et al. | | |
| 5,752,067 A | 5/1998 | Wilkinson et al. | | |
| 5,935,216 A | 8/1999 | Benner et al. | | |
| 6,115,829 A | 9/2000 | Slegel et al. | | |
| 6,195,676 B1 | 2/2001 | Spix et al. | | |
| 6,601,138 B2 | 7/2003 | Otterness et al. | | |
| 6,687,787 B1 | 2/2004 | Richardson et al. | | |
| 6,732,232 B2 | 5/2004 | Krishnamurthy | | |
| 6,845,428 B1 | 1/2005 | Kedem | | |
| 7,073,175 B2 | 7/2006 | Rehg et al. | | |
| 7,254,813 B2 | 8/2007 | Leong et al. | | |
| 7,318,126 B2 | 1/2008 | Finkler | | |
| 8,261,283 B2 * | 9/2012 | Tsafrir et al. | | 718/107 |
| 2008/0271038 A1 * | 10/2008 | Rolia et al. | | 718/105 |
| 2009/0320033 A1 * | 12/2009 | Gokhale et al. | | 718/103 |

OTHER PUBLICATIONS

Berger, E. et al. "Scalable Load Distribution and Load Balancing for Dynamic Parallel Programs." Department of Computer Science, University of Texas at Austin, 1999.

(Continued)

*Primary Examiner* — Eric C Wai
(74) *Attorney, Agent, or Firm* — Benoit & Cote Inc.

(57) ABSTRACT

Embodiments of the presently claimed invention automatically and systematically schedule jobs in a computer system thereby optimizing job throughput while simultaneously minimizing the amount of time a job waits for access to a shareable resource in the system. Such embodiments may implement a methodology that continuously pre-conditions the profile of requests submitted to a job scheduler such that the resulting schedule for the dispatch of those jobs results in optimized use of available computer system resources. Through this methodology, the intersection of the envelope of available computer system shareable resources may be considered in the context of the envelope of requested resources associated with the jobs in the system input queue. By using heuristic policies, an arrangement of allocations of available resources against requested resources may be determined thereby maximizing resource consumption on the processing system.

19 Claims, 3 Drawing Sheets

(56) References Cited

OTHER PUBLICATIONS

Wu, Xingfu et al. "Scalability of Parallel Algorithm Implementation." Department of Computer Science and Engineering, Beijing University of Aeronautics & Astronautics. 1996 IEEE. pp. 559-561.

Zhang, Xiaodong et al. "Measuring and Analyzing Parallel Computing Scalability." High Performance Computing and Software Laboratory, University of Texas at San Antonio. 1994 IEEE Proceedings of the International Conference on Parallel Processing. pp. II-295-II-303.

Annavaram, Murali et al. "Mitigating Amdahl's Law Through EPI Throttling." Microarchitecture Research Lab, Intel Corporation. 2005 IEEE.

Pontikakis, Bill et al. "Performance Improvement of Configurable Processor Architectures Using a Variable Clock Period." Departments of Electrical and Computer Engineering, Ecole Polytechnique de Montreal. 2005 IEEE Proceedings of the 9th International Database Engineering & Application Symposium.

Sun, Xian-He, et al. "Another Veiw on Parallel Speedup." Department of Computer Science, Michigan State University. IEEE. pp. 324-333, 1990.

* cited by examiner

OPTIMIZING ALLOCATION OF COMPUTER RESOURCES BY TRACKING JOB STATUS AND RESOURCE AVAILABILITY PROFILES

CROSS-REFERENCE TO RELATED APPLICATIONS

The present application claims the priority benefit of U.S. provisional patent application No. 61/189,359 filed Aug. 18, 2008 and entitled "Method for the Optimal Allocation of Scarce Computer Resources in Multi-Core Environments," the disclosure of which is incorporated herein by reference.

The present application is related to U.S. patent application Ser. No. 12/543,443 filed Aug. 18, 2009 and entitled "Scalable Work Load Management on Multi-Core Computer Systems," the disclosure of which is incorporated herein by reference.

BACKGROUND OF THE INVENTION

1. Field of the Invention

The present invention generally relates to resource allocation. More specifically, the present invention relates to dynamic resource allocation on computer systems that make use of multi-core processing units. The present invention further related to networks of computers with a plurality of computational modes, which may further implement multi-core processing units.

2. Description of the Related Art

FIG. 1 is a block diagram of a multi-core based computer system 100 as might be found in the prior art. The computer system 100 of FIG. 1 includes a collection of logical and physical resources, a number of which may be shared between work load units along various possible dimensions, such as shareable in time or shareable through partitioning. Embodiments of the present invention may be implemented in the general context of a computer system 100 like that illustrated in FIG. 1.

In the system 100 of FIG. 1, four central processing units (CPUs) 6 are illustrated, each of which may be capable of independently processing a job. For any given CPU 6 to be able to process a job, that CPU 6 must have available some or all of the computer memory 9, level 2 cache 8, multiplexed bus bandwidth 10, and possibly the exclusive use of some or all of the input/output (I/O) channels 11. Access to these system resources can be shared in both quantity and time.

For example, the CPUs 6, the level 2 cache 8, multiplexed bus 10, and the I/O channels 11, and the memory 9 can be considered shareable resources of the computer system 100. The level 1 cache 7 resources are implicitly tied to the CPUs 6 in system 100 in that they are shareable with the jobs, but not independently of the CPUs 6.

The system 100 of FIG. 1 may be presented with a stream of tasks or jobs, each of which requires a spectrum of shareable resources to be available for dispatch and execution. The computer system 100 will, ultimately, be faced with the problem of scheduling the execution of the individual jobs in some manner that will cause all of them to be executed by the system 100. The scheduling problem can have many dimensions to its resolution in that most job schedulers are designed to achieve some measurable goal, such as maximizing the throughput of jobs, minimizing the response time of jobs, or achieving some constraint in the processing of the jobs such as the respecting of deadlines for job completion.

Before any job can be dispatched to the computational resource, however, the job scheduler must be capable of assigning to the job all—and not less than all—of the shareable computer resources that are needed to run the particular job. For example, if a job needs a specific amount of main memory to run, it may not be dispatched until the job scheduler can be certain that the specific amount of memory is available for use by the job. An identical constraint exists with respect to execution of all other pending jobs.

A simple albeit limited strategy for the scheduling of jobs on the computational resource is to limit the number of jobs running on the system at anyone time to exactly one job. Presuming that it is feasible to run all of the jobs in the request queue, each of those jobs will then run in some sequence determined by the job scheduler-one at a time.

This strategy is inefficient with respect to the use of available computer resources in that a given job will, generally, be unable to consume 100 percent of computer systems resources over the elapsed time needed to complete processing. Available resources are thus left idle or, at best, underutilized. For example, data transfer between computer memory and relatively slower speed devices means that the processing unit of the computer will spend time waiting for the completion of slow speed events during processing oh the job. This 'idling' means that other pending jobs could be exploiting idle system resources through overlapping processing whereby the resources of the computer system can be shared between jobs.

Sharing resources may take any number of forms such as a scheme based on swapping of resources, partitioning, or some combination of both. For example, many computer systems implement a swapping mechanism for the sharing of memory whereby the memory resident components of a job are copied to a disk storage unit and replaced by the disk based image of the memory resident components of another task. In those environments where the processing unit is a single-core device or a monolithic processing element, time on the computing resource may be shared with a number of jobs using swapping whereby the core is partitioned and then allocated according to some heuristic policy.

In those instances where a computer system is presented with a job stream that does not represent an over-consumption of resources, job throughput may steadily improve until all of the shareable resources are fully consumed. A consequence of over-consumption, however, is that response time or service level of the system will degrade to the point where the mean arrival rate of a job at the input queue exceeds the mean processing time of the jobs. The effect on job processing is that the amount of time a particular work unit spends waiting for access to a resource increases with the number of jobs in the system.

There is a need in the art for the automatic and systematic scheduling of jobs in a computer system to optimize job throughput while simultaneously minimizing the amount of time a job waits for access to a shareable resource in the system.

SUMMARY OF THE CLAIMED INVENTION

Embodiments of the presently claimed invention automatically and systematically schedule jobs in a computer system thereby optimizing job throughput while simultaneously minimizing the amount of time a job waits for access to a shareable resource in the system.

DETAILED DESCRIPTION

Figure 1:
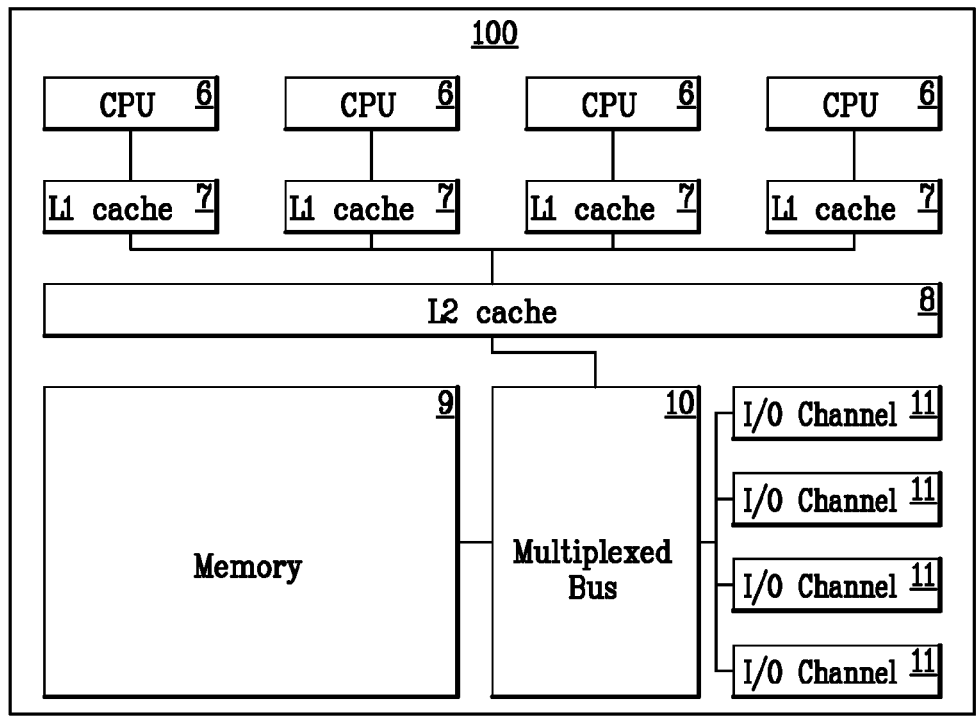
FIG. 1 is a block diagram of a multi-core based computer system as might be found in the prior art

Certain terminology utilized in the course of the present disclosure should be interpreted in an inclusive fashion unless otherwise limited by the express language of the claims. Notwithstanding, the following terms are meant to be inclusive of at least the following descriptive subject matter.

A processor core is inclusive of an electronic circuit design that embodies the functionality to carry out computations and input/output activity based on a stored set of instructions (e.g., a computer program).

A multi-core processor is inclusive of a central processing unit of a computer system that embodies multiple asynchronous processing units, each independently capable of processing a work load unit, such as a self contained process. Processor cores in a multi-core computer system may be linked together by a computer communication network embodied through shared access to common physical resources, as in a current generation multi-core central processor computer chip, or the network may be embodied through the use of an external network communication facility to which each processing core has access.

Shared computational resources are inclusive of those components in a computer system that may be shared between the processors of the computer systems. Shareable resources include, but are not limited to, memory, bus bandwidth, input/output bandwidth, and processor time. Shared resources are further inclusive of common resource pools that are partitioned amongst processor elements to the exclusive benefit of the individual processors. Subject to certain limitations as may be set forth in individual claims, shared resources may be to the express exclusion of multiple processors jointly accessing the same partition of a resource.

Resource requesters are inclusive of computer programs executable on the processing resources of a computer system that otherwise has a requirement for exclusive access to some or all of the available resources while in execution.

A resource consumer is inclusive of a computer program being executed on a computer system and actually consuming exclusively some or all of the shared computational resources of the computer system.

An allocation of the shared resources of a computer system is inclusive of a partition of the individual resources of the computer resources and the assignment of the partitions of the resources amongst the resources consumers.

An optimized allocation of shared resources of a computer system is inclusive of an allocation that consumes all, or substantially all, of the available resources of the computer system.

Embodiments of the present invention make use of information provided by the operating system and the jobs themselves to improve the performance of the job scheduling function of the operating system. The present invention seeks to ensure that the job scheduler of the operating system is continuously provided with a mix of jobs that can be processed in a manner that makes optimum use of the resources of the computer by eliminating conflicting or overlapping resource requests.

Figure 2:
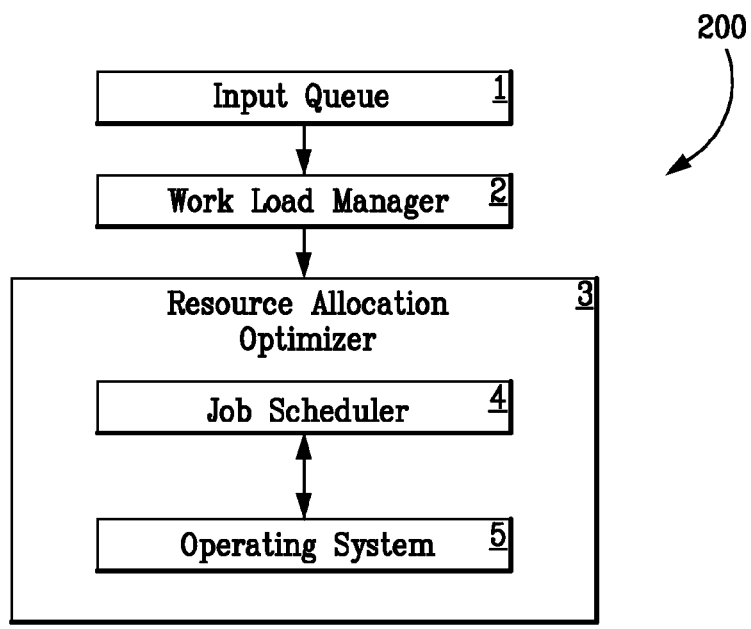
FIG. 2 illustrates implementation of a resource allocation optimization application in the context of an operating system.

FIG. 2 illustrates implementation of a resource allocation optimization application in the context of an operating system 200. The resource allocation optimization application 3 of FIG. 2 may be implemented as a wrapper layer around the functions of an operating system 5 that includes a job scheduler 4 tasked with the dispatch of work units or jobs and that make use of the physical resources of a computer system. These physical resources include, but are not limited to, CPUs, memory, I/O channels, and physical storage.

In FIG. 2, an input queue 1 serves as a gateway for a source of jobs destined for processing on a computer system. Those jobs pass through the queue 1 and are presented to a work load manager 2, which acts to apply ordering and constraints to the job stream and ultimately submit a modified job stream to the job scheduler 4. Work load managers come in a wide variety of implementations designed for use in particular processing environments and may implement constraints that range from having no effect on the original job stream to extensively re-ordering the same.

The nature, form, behavior, and function of the work load manager 2 is not necessarily relevant to the operation of the invention and, in some embodiments, may not be present at all although its functional existence as part of the flow of work units to the job scheduler 4 from the input queue 1 is otherwise necessary. The workload manager 2 otherwise provides a mechanism for the introduction of work load units into the resource allocation optimizer 3.

As illustrated in FIG. 2, the job scheduler 4 is a component of the operating system 5 of the computer system processing the job stream provided by the work load manager 2. The job scheduler 4 is responsible for the dispatch of the jobs in the job stream based on the immediate availability of all of the computer resources required for the processing of the job. In an exemplary embodiment of the present invention, the job scheduler 4 and the operating system 5 interface through the resource allocation optimizer 3, which provides for the submission of jobs to the job scheduler 4 and for the monitoring and control of jobs that are already running through the collection of resource consumption information by the jobs themselves.

While reference has been made to the implementation of the resource allocation optimizer in the context of the computer system of FIG. 1, such implementation is not limited to that particular embodiment. Alternative embodiments include a network of systems 100 and/or other possible computer system designs connected through an external communications network in peer-to-peer or hierarchical deployments. Further embodiments include those where each and every one of the shareable resources exists as an independent network connected resource. Further, the level 2 8 cache and the multiplexed bus components of the system 100 can be replaced with one or more computer communications networks capable of the exchange of data between the various shareable resources without dilution of the applicability of the present invention.

Embodiments of the present invention may implement a methodology that continuously pre-conditions the profile of requests submitted to a job scheduler such that the resulting schedule for the dispatch of those jobs results in optimized use of available computer system resources. Through this methodology, embodiments of the present invention may consider the intersection of the envelope of available computer system shareable resources with the envelope of requested resources associated with the jobs in the system input queue. By using heuristic policies, the invention may determine which arrangement of allocations of available resources against requested resources will maximize resource consumption on the processing system.

Resources consumed on a computer system implementing embodiments of the present invention are accounted for using a scheme that begins with an inventory of available resources on an idle computer system. The scheme subsequently maintains a balance of such resources by accounting for all resources consumed by jobs running on the computer system and any changes that are made to the resource availability profile based on reconfigurations of the processing facility as is disclosed in co-pending U.S. patent application Ser. No. 12/543,443, the disclosure of which has been previously incorporated herein by reference. Resource configuration alterations encompass not only intentional modifications such as the addition of processing cores or processing elements, but also the consequences of unintentional events such as the failure or partial failure of components of the processing facility.

The accounting balance is achieved by accumulating the reported quantity of the resources consumed by any job as it runs on the processing facility and the resource availability consequences of dynamic changes to the configuration of the processing facility. For example, on a computer system with some quantity X of total memory, when a job is dispatched that consumes a quantity Y of memory, the balance of memory available for allocation to other jobs is then the quantity Z, which corresponds to X-Y.

The method of achieving the accounting balance of resource availability can encompass any technique that has the capability of acquiring the required resource consumption information for use in the accounting algorithm. Methods include, but are not limited to, the sampling of resource consumption at periodic intervals, the acquisition of such data as reported by computer operating system software, and from special purpose devices, software or mechanisms that are designed for such a specific purpose.

During processing, a job may signal that it can release a quantity Q of a resource that the job previously acquired. In the case of memory, the accounting method would then compute a new quantity of available memory as $Z_1=Z+Q$. At all points in time during the processing of jobs on the computer system, the accounting scheme employed by the present invention makes use of the actual reported quantities of consumed resources to maintain an accurate profile of resource availability. Notwithstanding, there is no requirement to sample the state of resource availability at any given time.

An allocation algorithm considers the physical characteristics of the computer system in which it is implemented. Through execution of this algorithm, job throughput and service level performance characteristics are maximized through the use of any number of heuristic policies that are developed by considering reasonable and feasible partitions of the shareable resources of the computer facility, and the profile of resources requests in the job queue. A given job is then qualified for submission to the computer system job scheduler if an allocation of available resources is possible that will enable dispatch of the job. A reasonable partition of a shareable resource is a division of a resource into allocation units that can be exploited to accomplish some usable work. All computer resources have performance characteristics that define an envelope in a quantity versus time space which may be viewed as set forth in FIG. 3.

Figure 3:
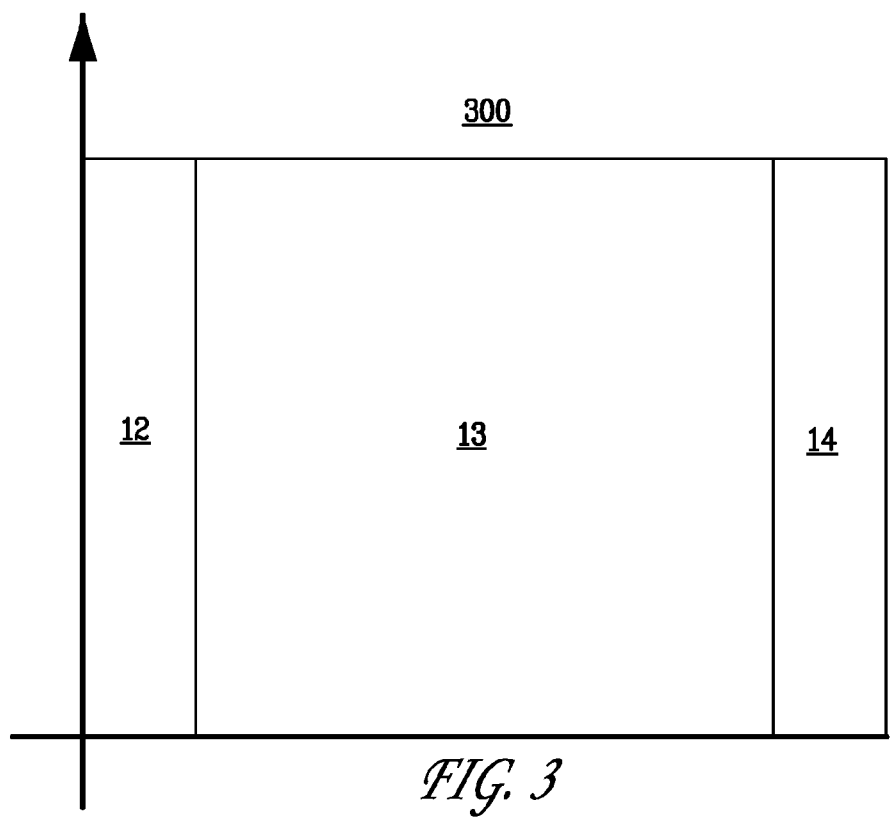
FIG. 3 illustrates a shareable resource in the context of quantity and time.

FIG. 3 illustrates a shareable resource 300 in the context of quantity and time. The shareable resource 300 of FIG. 3 is characterized by an initialization period 12, an exploitation period 13, and a disposal period 14. Once an allocation to a job occurs, the characteristics of the resource itself impose a period of time whereby the quantity of the resource to be used by the job must be initialized for the job's use. In the case of computer memory, this may involve loading the quantity of memory from an image stored on a disk unit. During this setup period, the job itself cannot make use of the resource for processing. Similarly, when a resource is released, there will generally be a period of time where the resource is unavailable while it is disposed of in some manner. An example of disposition of a block of memory might involve copying its contents to a disk storage unit for later recovery.

Between the initialization 12 and disposal 14 phases, the resource envelope 13 can be exploited by the job for processing. A reasonable resource allocation is then the partition of the shareable resource into envelopes such that there is the possibility of the job to which it is allocated doing a useful amount of work. A feasible allocation is any allocation of less than the available amount of a resource. The partition of the time dimension is extensible to any requirement, although in practice the resource may be shared in time as well as in quantity.

A reasonable and feasible allocation may be a region of the quantity versus space plane that supports a policy based allocation heuristic that is designed to optimize some performance characteristic of the processing system. The dimensions of the allocation envelope in the quantity versus time plane represent configurable parameters that can be some desirable extrema of a performance measure.

An embodiment of the present invention on a multi-core computer system might use the following heuristic policy:

Available processor cores is 3 on a 4 core machine;

Available memory is 12 Gbytes on a 16 Gbyte machine; and

Job requirements are 2 cores and 8 Gbytes of memory.

The requested requirements are within the envelope of available resources, so the job is a candidate for dispatch. An accounting operation then results in a new resource availability profile of 1 out of 4 cores and 4 Gbytes of available memory. The allocation mechanism can then examine other candidates in the job queue with the view of identifying another job for dispatch. This process iterates until either no other jobs can be selected for dispatch, or all of the available resources of the system are allocated.

Figure 4:
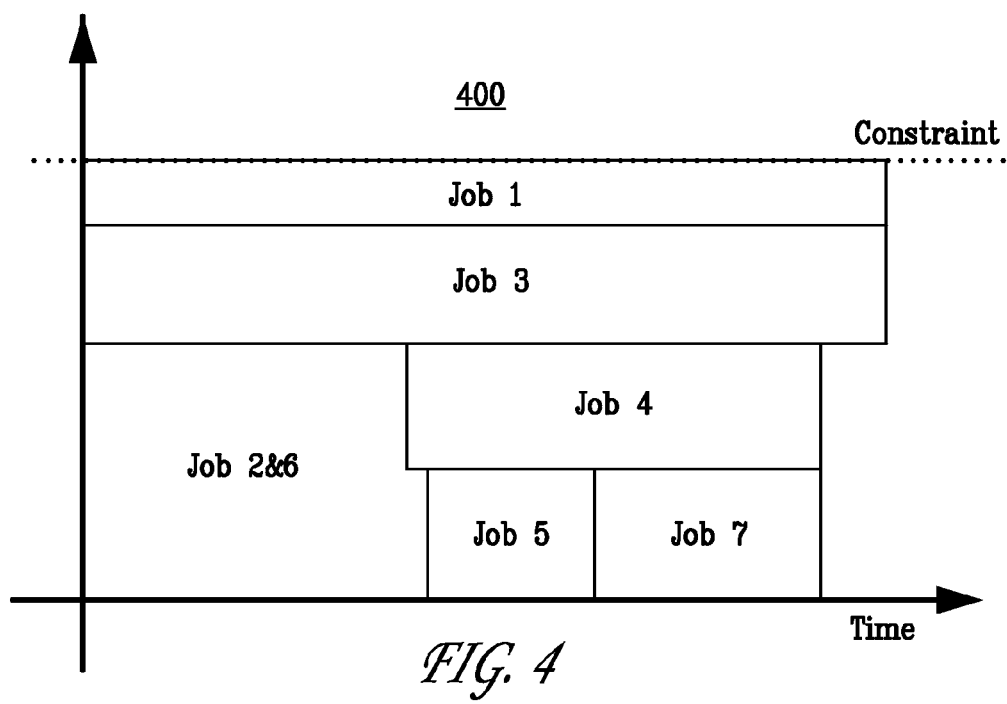
FIG. 4 illustrates an instance of optimized resource allocation in the context of quantity, time, and a further constraint.

FIG. 4 illustrates an instance of optimized resource allocation 400 in the context of quantity, time, and a further constraint. FIG. 4 shows the results of an optimal allocation of the resource request for a given shareable resource for an ensemble of 6 jobs, each requesting a different envelope for the resource in question. The envelopes of the various jobs are packed into the quantity versus time space for the resource leaving no empty regions, which are otherwise indicative of under-utilization of resources. The constraint of FIG. 4 is the bound on the quantity of the resource configured on the processing facility at the time the allocation is made. Each of the partitions of the quantity versus time space also represent a reasonable and feasible allocation in the context of the operating policies from the processing facility.

Jobs with resource request envelopes that would be individually not reasonable, either because their quantity is too small to reserve at a useful level, or because their time span is too short to provide for efficient resource utilization, may be allocated into partitions that are themselves subject to sub-allocation. The same kinds of heuristic rules for the allocation are applied albeit in the context of the ensemble of grouped jobs being managed as a block, rather than as individual entities. The profile of resources is a vector of quantities of arbitrary length related to the design characteristics of the processing system. The specific structure of the heuristics employed will also be conditioned by the form and nature of the elements of the resource vector.

In selecting entries in a job request queue for dispatch that are guaranteed to never oversubscribe available resources, the selection method may be based on architectural characteristics of the processing system and the goal of maximizing throughput and service level metrics related to system ability to process the job load. The implementation of the selection method is through configurable heuristic rules appropriate for each architecture whereby achievement of the optimization goals is a consequence of the iterative nature of the selection algorithm.

An initial filtering of the job queue to effect optimal resource consumption as described above may result in a static allocation over the duration of the processing time for the shortest of the jobs selected for dispatch. Such an allocation granularity can result in less than optimal use of resources because all dispatched jobs may starve otherwise executable jobs in the input queue simply because they have released some resources but have not completed execution. An example of such a job might be one that initially acquires a substantial amount of memory for initialization data, but then discards the memory and embarks on a long computation.

Embodiments of the present invention implement a mechanism of maintaining optimal resource use on the computer facility by defining a set of job states, and specifying the transitions allowable between states for any given job based on the results of a resource allocation exercise. In an exemplary embodiment, job states with labels such as 'input,' 'running,' 'waiting' and 'finished' each provide a framework for the implementation of continuous dynamic resource allocation optimization. Jobs pending dispatch are assigned to the 'input' state whereas jobs currently in execution are assigned to the 'running' state. Jobs that have been dispatched but are suspended from execution are assigned the 'waiting' state, and jobs that are complete are assigned the 'finished' state.

Heuristic rules specifying the transition rules for jobs from one state to another define operation of a finite state machine that oversees the progress of a job through the processing facility. Using an embodiment of the present invention as described above, a job entering the input queue and that cannot be immediately dispatched is assigned an 'input' state and waits until a situation arises that would make it a candidate for dispatch. Jobs that are executable whereby resource requests can be satisfied by the current resource ability profile or jobs that have been previously dispatched and are currently running are assigned to the 'running' state.

Jobs in the 'running' state can reconfigure the resources used and thereby affect the resource availability profile. Changes to the resource consumption profile of a running job signal the comparison of the new resource availability profile, which can trigger a new optimal allocation of resources against the combined envelope of requests from jobs in the 'input,' 'running,' and 'waiting' state.

Figure 5:
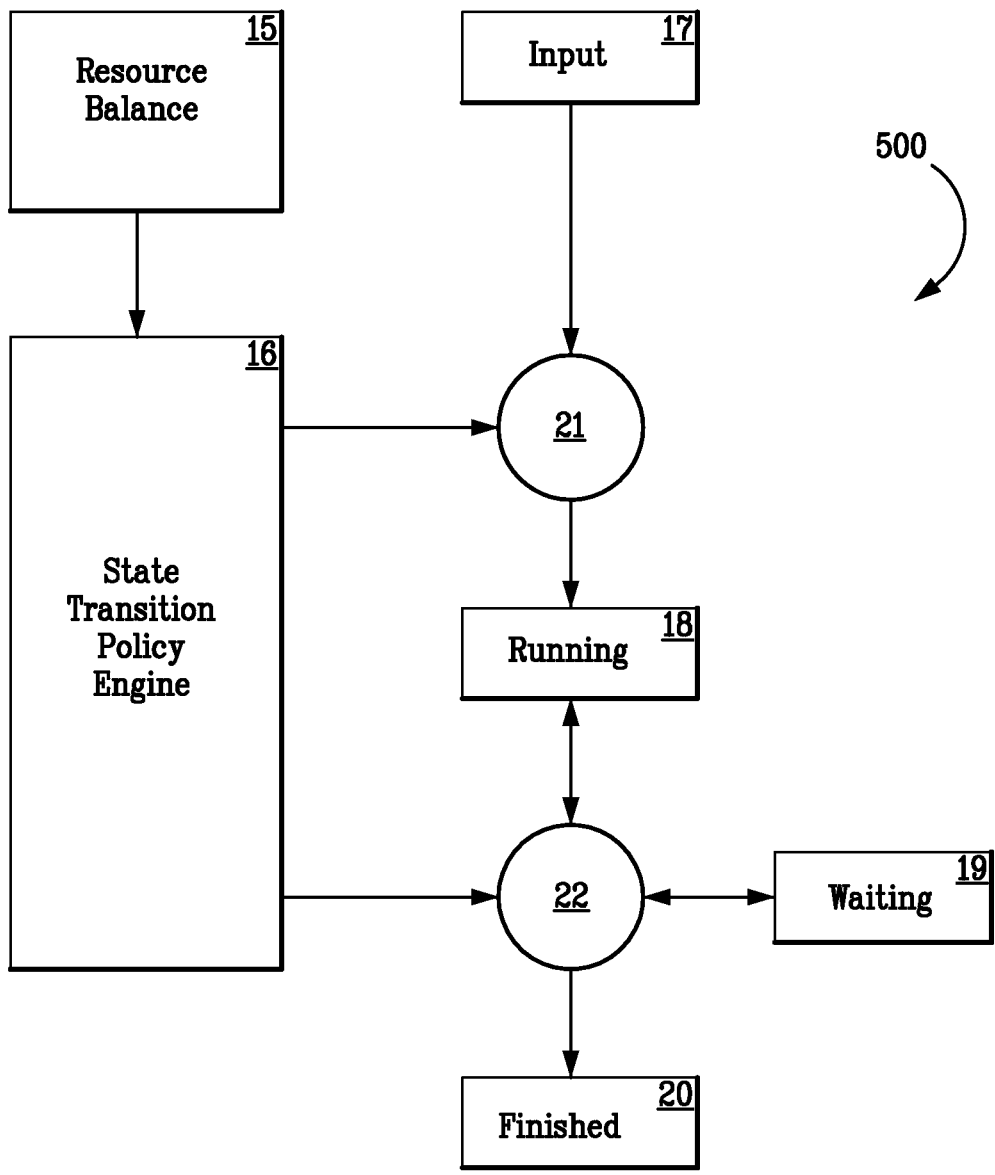
FIG. 5 illustrates updating current resource availability 500 in accordance with an embodiment of the present invention.

FIG. 5 illustrates updating current resource availability 500 in accordance with an embodiment of the present invention. When an event occurs during the processing of a job on the computer system that initiates an update to the current resource availability, the new resource balance 15 is made available to the state transition policy engine 16. The state policy transition engine 16 then examines the current structure of resource requests for jobs in the input state 17, running state 18, and waiting state 19.

Tunable heuristic policies implement the following possible transitions:

Jobs in the "running" state 18 may remain in the "running" state 18 or be moved to the "waiting" state 19 or be moved to the "finished" state 20;

Jobs in the "waiting" state 19 may remain in the "waiting" state 19 or be moved to the "running" state 18; and Jobs in the "input" state 17 may remain in the "input" state 17 or be moved to the "running" state 18.

The actual instances of the heuristic policies are tunable to achieve throughput and performance objectives set for the processing system and are optimized for the characteristics of the hardware platform and the job request profiles that are anticipated. From the point of view of the flow of jobs between the various possible states, the state transition engine 16 applies the relevant heuristics at the locations 21 and 22 of the schematic illustrated in FIG. 5. These points act as gates between the possible states of a job and are controlled by the relevant heuristic policies as applied to the current resource balance 15 updated by the latest accounting action.

Job state transitions are automatically managed to continuously maintain an optimal allocation of available resources against requested resources. The heuristic policies defining the operation of the job state carry the job through a series of state from the "input" state 17 to the "finished" state 20. Jobs in the "running" state 18 can be suspended and moved to the "waiting" state 19 to prevent, for example, any given allocation from starving other requesters indefinitely by limiting resource consumption by methods such as partitioning the time available for a resource into allocation chunks that, once consumed, initiate a reallocation event.

Computer-readable storage media refer to any medium or media that participate in providing instructions to a central processing unit (CPU), which may include a multi-core processor, for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge. The various methodologies discussed herein may be implemented as software and stored in any one of the aforementioned media for subsequent execution by a processor, including a multi-core processor.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The present descriptions are intended to cover such alternatives, modifications, and equivalents as may be included within the spirit and scope of the invention as defined by the appended claims and otherwise appreciated by one of ordinary skill in the art. The steps of various methods may be performed in varying orders while achieving common results thereof. Various elements of the disclosed system and apparatus may be combined or separated to achieve similar results. The scope of the invention should be determined not with reference to the above descrip-

What is claimed is:

1. A method for maximizing use of shared computing resources in a computing system, the method comprising:
   receiving a plurality of job requests;
   storing said job requests in a queue;
   determining, for each job request, a resource consumption profile including a set of first values, each first value corresponding to a different resource and representing a required amount of that resource for executing the job request;
   maintaining a resource availability profile for said computing resources as the system runs, said resource availability profile including a set of second values, each second value corresponding to a different resource and representing an un-used amount of that resource;
   assigning a status for each job request, said status comprising at least one of: input, running, waiting, and finished; wherein the input status applies to job requests in the queue, the running status applies to job requests being currently executed, the waiting status applies to job requests that have been dispatched but are suspended from execution, the finished status applies to job requests whose execution is finished;
   dynamically and continuously reordering the job requests in the queue as the execution runs based on the first values and the second values, the reordering including suspending one or more job requests which are presently running by placing them in the waiting status, and/or transitioning one or more job requests from the waiting status to the running status for selecting a mix of job requests which when dispatched for execution minimize the second values to a lowest possible, thus maximizing use of the computing resources in the computing system;
   wherein each of the jobs in the running status can make changes to its resource consumption profile to signal the comparison of a new resource availability profile to trigger the reordering for a new optimal allocation of computer resources.

2. The method of claim 1, wherein dynamically reordering comprises dispatching a particular job request for execution when the first values associated with the particular job request are lower than or equal to the corresponding second values of the resource availability profile, irrespective of an order of the job request in the queue.

3. The method of claim 1, wherein dynamically reordering comprises advancing an order associated with a particular job request in the queue when the first values associated with the particular job request are lower than or equal to the corresponding second values of the resource availability profile.

4. The method of claim 1, wherein dynamically reordering comprises retarding an order associated with a particular job request in the queue when one or more of the first values associated with the particular job request are higher than the corresponding second values of the resource availability profile.

5. The method of claim 1, further comprising, when the status of a particular job request changes from input to running, decrementing the second values of the resource availability profile by the first values associated with the particular job request.

6. The method of claim 1, further comprising, when the status of a particular job request changes from running to finished, incrementing the second values of the resource availability profile by the first values associated with the particular job request.

7. The method of claim 1, wherein the computing resources include at least two of: memory, bus bandwidth, input/output bandwidth, and processor time.

8. The method of claim 1, wherein dynamically reordering comprises applying heuristic rules to the first values and the second values as the system is running to determine a re-ordering arrangement that maximises resource consumption.

9. The method of claim 1, further comprising dispatching a plurality of job requests for execution, wherein sums of the first values associated with each job request are lower than or equal to the corresponding second values of the resource availability profile.

10. A non-transitory memory having recorded thereon computer readable instructions for implementing the method of claim 1.

11. A computing system comprising a plurality of shared computing resources, said system comprising:
    a memory comprising an input queue for storing a plurality of job requests;
    a processor for executing said job requests;
    a job scheduler for allocating computing resources to the job requests;
    a resource allocation optimizer adapted to:
       determine, for each job request, a resource consumption profile including a set of first values, each first value corresponding to a different resource and representing a required amount of that resource for executing the job request;
       maintain a resource availability profile for said computing resources, said resource availability profile including a set of second values, each second value corresponding to a different resource and representing an un-used amount of that resource;
       assigning a status for each job request, said status comprising at least one of: input, running, waiting, and finished; wherein the input status applies to job requests in the queue, the running status applies to job requests being currently executed, the waiting status applies to job requests that have been dispatched but are suspended from execution, the finished status applies to job requests whose execution is finished; and
       continuously and dynamically reorder the job requests in the queue based on the first values and the second values including suspending one or more job requests which are presently running by placing them in the waiting status, and/or transitioning one or more job requests from the waiting status to the running status for selecting a mix of job requests which when dispatched for execution minimize the second values to a lowest possible, for maximizing use of the computing resources in the computing system, wherein each of the jobs in the running status can make changes to its resource consumption profile to signal the comparison of a new resource availability profile to trigger the reordering for a new optimal allocation of computer resources.

12. The computing system of claim 11, wherein the system dispatches a particular job request for execution when the first values associated with the particular job request are lower than or equal to the corresponding second values of the resource availability profile, irrespective of an order of the job request in the queue.

13. The computing system of claim 11, wherein the system advances an order associated with a particular job request in the queue when the first values associated with the particular job request are lower than or equal to the corresponding second values of the resource availability profile.

14. The computing system of claim 11, wherein the system retards an order associated with a particular job request in the queue when one or more of the first values associated with the particular job request are higher than the corresponding second values of the resource availability profile.

15. The computing system of claim 11, wherein, when the status of a particular job request changes from input to running, the system decrements the second values of the resource availability profile by the first values associated with the particular job request.

16. The computing system of claim 11, wherein when the status of a particular job request changes from running to finished, the system increments the second values of the resource availability profile by the first values associated with the particular job request.

17. The computing system of claim 11, wherein the computing resources include at least two of: memory, bus bandwidth, input/output bandwidth, and processor time.

18. The computing system of claim 11, wherein the system applies heuristic rules to the first values and the second values as the system is running to determine a re-ordering arrangement that maximises resource consumption.

19. The computing system of claim 11, wherein the system dispatches a plurality of job requests for execution, wherein sums of the first values associated with each job request are lower than or equal to the corresponding second values of the resource availability profile.

* * * * *